(12) United States Patent
Beavis et al.

(10) Patent No.: US 11,661,329 B2
(45) Date of Patent: May 30, 2023

(54) SYSTEM AND METHOD FOR GENERATING A DRIVE SIGNAL

(71) Applicant: DEKA Products Limited Partnership, Manchester, NH (US)

(72) Inventors: Russell H. Beavis, Merrimack, NH (US); James J. Dattolo, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 17/568,139

(22) Filed: Jan. 4, 2022

(65) Prior Publication Data
US 2022/0127129 A1 Apr. 28, 2022

Related U.S. Application Data

(63) Continuation of application No. 16/933,414, filed on Jul. 20, 2020, now Pat. No. 11,214,476, which is a
(Continued)

(51) Int. Cl.
*B67D 1/00* (2006.01)
*B67D 1/08* (2006.01)
(Continued)

(52) U.S. Cl.
CPC ........... *B67D 1/122* (2013.01); *B67D 1/0034* (2013.01); *B67D 1/0036* (2013.01);
(Continued)

(58) Field of Classification Search
CPC .... B67D 1/122; B67D 1/0036; B67D 1/0037; B67D 1/102; B67D 1/104; B67D 1/10;
(Continued)

(56) References Cited

U.S. PATENT DOCUMENTS

| | | |
|---|---|---|
| 2,982,895 A | 5/1961 | Exon |
| 3,738,356 A | 6/1973 | Workman |

(Continued)

FOREIGN PATENT DOCUMENTS

| | | |
|---|---|---|
| EP | 105017 | 9/1983 |
| EP | 112791 | 9/1983 |

(Continued)

OTHER PUBLICATIONS

International Search Report with Written Opinion, dated Mar. 6, 2009, received in international patent application No. PCT/US08/075473, 9 pgs.

(Continued)

*Primary Examiner* — Frederick C Nicolas
(74) *Attorney, Agent, or Firm* — Mark E. Tetreault

(57) ABSTRACT

A method and computer program product for defining a PWM drive signal having a defined voltage potential. The PWM drive signal has a plurality of "on" portions and a plurality of "off" portions that define a first duty cycle for regulating, at least in part, a flow rate of a pump assembly. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

10 Claims, 8 Drawing Sheets

Related U.S. Application Data continuation of application No. 16/266,772, filed on Feb. 4, 2019, now Pat. No. 10,717,638, which is a continuation of application No. 15/488,942, filed on Apr. 17, 2017, now Pat. No. 10,196,257, which is a continuation of application No. 14/987,138, filed on Jan. 4, 2016, now Pat. No. 9,624,084, which is a continuation of application No. 14/492,681, filed on Sep. 22, 2014, now Pat. No. 9,227,826, which is a continuation of application No. 13/346,288, filed on Jan. 9, 2012, now Pat. No. 8,839,989, which is a continuation of application No. 13/047,125, filed on Mar. 14, 2011, now Pat. No. 8,091,736, which is a continuation of application No. 11/851,344, filed on Sep. 6, 2007, now Pat. No. 7,905,373, which is a continuation-in-part of application No. 11/276,548, filed on Mar. 6, 2006, now Pat. No. 7,740,152.

(51) Int. Cl.

| | | |
|---|---|---|
| *B67D 1/10* | (2006.01) | |
| *B67D 1/12* | (2006.01) | |
| *F04B 13/02* | (2006.01) | |
| *F04B 49/06* | (2006.01) | |
| *F04B 51/00* | (2006.01) | |
| *F04D 15/00* | (2006.01) | |
| *G05B 15/02* | (2006.01) | |
| *F04B 49/02* | (2006.01) | |
| *F04B 23/04* | (2006.01) | |

(52) U.S. Cl.
CPC ......... *B67D 1/0037* (2013.01); *B67D 1/0888* (2013.01); *B67D 1/10* (2013.01); *B67D 1/102* (2013.01); *B67D 1/104* (2013.01); *F04B 13/02* (2013.01); *F04B 23/04* (2013.01); *F04B 49/02* (2013.01); *F04B 49/065* (2013.01); *F04B 51/00* (2013.01); *F04D 15/0027* (2013.01); *G05B 15/02* (2013.01); *B67D 2001/0097* (2013.01)

(58) Field of Classification Search
CPC ............... B67D 1/0034; B67D 1/0888; B67D 2001/0097; F04D 15/0027; G05B 15/02; F04B 49/065; F04B 51/00; F04B 23/04; F04B 49/02; F04B 13/02
See application file for complete search history.

(56) References Cited

U.S. PATENT DOCUMENTS

| | | |
|---|---|---|
| 4,014,319 A | 3/1977 | Favre |
| 4,315,523 A | 2/1982 | Mahawili et al. |
| 4,613,325 A | 9/1986 | Abrams |
| 4,655,123 A | 4/1987 | Schrader |
| 4,779,761 A | 10/1988 | Rudick et al. |
| 4,941,353 A | 7/1990 | Fukatsu et al. |
| 4,967,932 A | 11/1990 | Wiley et al. |
| 4,979,639 A | 12/1990 | Hoover et al. |
| 4,981,024 A | 1/1991 | Beldham |
| 5,014,211 A | 5/1991 | Turner et al. |
| 5,058,630 A | 10/1991 | Wiley et al. |
| 5,114,047 A | 5/1992 | Baron et al. |
| 5,121,855 A | 6/1992 | Credle, Jr. |
| 5,134,962 A | 8/1992 | Amada et al. |
| 5,141,130 A | 8/1992 | Wiley et al. |
| 5,145,339 A | 9/1992 | Lehrke et al. |
| 5,181,631 A | 1/1993 | Credle, Jr. |
| 5,192,000 A | 3/1993 | Wandrick et al. |
| 5,240,380 A | 8/1993 | Mabe |
| 5,305,915 A | 4/1994 | Kamysz et al. |
| 5,350,082 A | 9/1994 | Kiriakides, Jr. et al. |
| 5,437,842 A | 8/1995 | Jensen et al. |
| 5,457,626 A | 10/1995 | Wolze |
| 5,490,447 A | 2/1996 | Giulaino |
| 5,499,741 A | 3/1996 | Scott et al. |
| 5,615,801 A | 4/1997 | Schroeder |
| 5,641,892 A | 6/1997 | Larkins et al. |
| 5,673,820 A | 10/1997 | Green et al. |
| 5,755,683 A | 5/1998 | Houle |
| 5,757,667 A | 5/1998 | Shannon et al. |
| 5,772,637 A | 6/1998 | Heinzmann et al. |
| 5,797,519 A | 8/1998 | Schroeder et al. |
| 5,829,636 A | 11/1998 | Vuong et al. |
| 5,842,603 A | 12/1998 | Schroeder et al. |
| 5,857,589 A | 1/1999 | Cline et al. |
| 5,884,813 A | 3/1999 | Bordonaro et al. |
| 5,920,226 A | 7/1999 | Mimura |
| 5,947,692 A | 9/1999 | Sahlin et al. |
| 5,967,367 A | 10/1999 | Orsborn |
| 5,971,714 A | 10/1999 | Schaffer et al. |
| 5,992,685 A | 11/1999 | Credle, Jr. |
| 5,996,660 A | 12/1999 | Phallen et al. |
| 6,038,519 A | 3/2000 | Gauthier et al. |
| 6,070,761 A | 6/2000 | Bloom et al. |
| 6,165,154 A | 12/2000 | Gray et al. |
| 6,186,193 B1 | 2/2001 | Phallen et al. |
| 6,195,588 B1 | 2/2001 | Gauthier et al. |
| 6,210,361 B1 | 4/2001 | Kamen et al. |
| 6,234,997 B1 | 5/2001 | Kamen et al. |
| 6,312,589 B1 | 11/2001 | Jarocki et al. |
| 6,321,587 B1 | 11/2001 | Demers et al. |
| 6,364,857 B1 | 4/2002 | Gray et al. |
| 6,435,375 B2 | 8/2002 | Durham et al. |
| 6,451,211 B1 | 9/2002 | Plester et al. |
| 6,464,464 B2 | 10/2002 | Sabini et al. |
| 6,464,667 B1 | 10/2002 | Kamen et al. |
| 6,549,816 B2 | 4/2003 | Gauthier et al. |
| 6,550,642 B2 | 4/2003 | Newman et al. |
| 6,564,971 B2 | 5/2003 | Heyes |
| 6,600,882 B1 | 7/2003 | Applegate |
| 6,613,280 B2 | 9/2003 | Myrick et al. |
| 6,640,650 B2 | 11/2003 | Matsuzawa et al. |
| 6,648,240 B2 | 11/2003 | Simmons |
| 6,669,051 B1 | 12/2003 | Phallen et al. |
| 6,669,053 B1 | 12/2003 | Garson et al. |
| 6,685,054 B2 | 2/2004 | Kameyama |
| 6,701,194 B2 | 3/2004 | Gauthier et al. |
| 6,709,417 B1 | 3/2004 | Houle |
| 6,726,656 B2 | 4/2004 | Kamen et al. |
| 6,729,226 B2 | 5/2004 | Mangiapane |
| 6,745,592 B1 | 6/2004 | Edrington et al. |
| 6,756,069 B2 | 6/2004 | Scoville et al. |
| 6,792,847 B2 | 9/2004 | Tobin et al. |
| 6,807,460 B2 | 10/2004 | Black et al. |
| 6,845,886 B2 | 1/2005 | Henry et al. |
| 6,994,231 B2 | 2/2006 | Jones |
| 7,108,024 B2 | 9/2006 | Navarro |
| 7,108,156 B2 | 9/2006 | Fox |
| 7,156,115 B2 | 1/2007 | Everett et al. |
| 7,156,259 B2 | 1/2007 | Bethuy et al. |
| 7,162,391 B2 | 1/2007 | Knepler et al. |
| 7,164,966 B2 | 1/2007 | Sudolcan |
| 7,214,210 B2 | 5/2007 | Kamen |
| 7,223,426 B2 | 5/2007 | Cheng et al. |
| 7,243,818 B2 | 7/2007 | Jones |
| 7,159,743 B2 | 8/2007 | Brandt et al. |
| 7,299,944 B2 | 11/2007 | Roady et al. |
| 7,356,381 B2 | 4/2008 | Crisp, III |
| 7,559,346 B2 | 7/2009 | Herrick et al. |
| 7,617,850 B1 | 11/2009 | Dorney |
| 7,740,152 B2 * | 6/2010 | Hughes ............ F04B 13/02 700/254 |
| 7,905,373 B2 * | 3/2011 | Beavis ............ B67D 1/104 318/696 |
| 8,091,736 B2 * | 1/2012 | Beavis ............ F04D 15/0027 700/231 |
| 8,322,570 B2 | 12/2012 | Beavis et al. |
| 8,746,506 B2 | 6/2014 | Jersey et al. |
| 8,839,989 B2 * | 9/2014 | Beavis ............ F04B 13/02 700/231 |

(56) References Cited

U.S. PATENT DOCUMENTS

| | | | |
|---|---|---|---|
| 8,985,396 B2 | 3/2015 | Jersey et al. | |
| 9,227,826 B2* | 1/2016 | Beavis | F04B 13/02 |
| 9,624,084 B2* | 4/2017 | Beavis | G05B 15/02 |
| 10,018,586 B2 | 7/2018 | Matsuoka et al. | |
| 10,173,881 B2* | 1/2019 | Beavis | B67D 1/0888 |
| 10,196,257 B2* | 2/2019 | Beavis | B67D 1/0036 |
| 10,459,459 B2* | 10/2019 | Beavis | G05D 7/0635 |
| 10,626,003 B2* | 4/2020 | Wyatt | B67D 1/0037 |
| 10,717,638 B2* | 7/2020 | Beavis | F04D 15/0027 |
| 10,913,648 B2* | 2/2021 | Ubidia | F04B 17/03 |
| 10,927,742 B2* | 2/2021 | Tan | F01N 3/103 |
| 11,214,476 B2* | 1/2022 | Beavis | B67D 1/104 |
| 2001/0041139 A1 | 11/2001 | Sabini et al. | |
| 2002/0060226 A1 | 5/2002 | Kameyama | |
| 2003/0091443 A1 | 5/2003 | Sabini et al. | |
| 2003/0116177 A1 | 6/2003 | Appel et al. | |
| 2004/0084475 A1 | 5/2004 | Bethuy et al. | |
| 2005/0103799 A1 | 5/2005 | Litterst et al. | |
| 2005/0166761 A1 | 8/2005 | Jones et al. | |
| 2005/0166766 A1 | 8/2005 | Jones et al. | |
| 2005/0269360 A1 | 12/2005 | Piatnik et al. | |
| 2006/0043101 A1 | 3/2006 | Bhimani et al. | |
| 2006/0054614 A1 | 3/2006 | Baxter et al. | |
| 2006/0081653 A1 | 4/2006 | Bolland et al. | |
| 2006/0172056 A1 | 8/2006 | Tobin et al. | |
| 2006/0174778 A1 | 8/2006 | Greiwe | |
| 2006/0180610 A1 | 8/2006 | Haskayne | |
| 2006/0213928 A1 | 9/2006 | Ufheil et al. | |
| 2006/0237556 A1 | 10/2006 | Wulteputte et al. | |
| 2006/0241550 A1 | 10/2006 | Kamen | |
| 2006/0292012 A1 | 12/2006 | Brudevold et al. | |
| 2007/0009365 A1 | 1/2007 | Litterst et al. | |
| 2007/0085049 A1 | 4/2007 | Houle | |
| 2008/0008609 A1 | 1/2008 | Pate et al. | |
| 2008/0029541 A1 | 2/2008 | Wallace et al. | |
| 2008/0054837 A1 | 3/2008 | Beavis et al. | |
| 2008/0073610 A1 | 3/2008 | Manning | |

FOREIGN PATENT DOCUMENTS

| | | |
|---|---|---|
| EP | 154681 | 9/1984 |
| EP | 532062 | 11/1995 |
| EP | 0810370 | 12/1997 |
| EP | 796218 | 7/1999 |
| EP | 1050753 | 11/2000 |
| EP | 1356866 | 10/2003 |
| EP | 1690592 | 2/2005 |
| EP | 1762138 | 3/2007 |
| EP | 1783568 | 5/2007 |
| GB | 2416757 | 2/2006 |
| GB | 2429694 | 7/2007 |
| JP | 2004093065 | 3/2004 |
| WO | 9511855 | 5/1995 |
| WO | 0029103 | 5/2000 |
| WO | 0068136 | 11/2000 |
| WO | 01083360 | 11/2001 |
| WO | 02059035 | 8/2002 |
| WO | 02066835 | 8/2002 |
| WO | 2005068836 | 7/2005 |
| WO | 2006012916 | 2/2006 |
| WO | 2006036353 | 4/2006 |
| WO | 2006070257 | 7/2006 |
| WO | 2006108606 | 10/2006 |
| WO | 2007002575 | 1/2007 |
| WO | 2009090354 | 7/2009 |

OTHER PUBLICATIONS

International Search Report with Written Opinion, dated May 11, 2009, received in international patent application No. PCT/USOS/075502, 14 pgs.

International Preliminary Report with Written Opinion, dated Mar. 18, 2010, received in international patent application No. PCT/US08/075502, 7 pgs.

International Preliminary Report on Patentability, dated Mar. 18, 2010, received in international patent application No. PCT/US08/075473, 6 pgs.

International Search Report and Written Opinion dated Mar. 6, 2012, received in international patent application No. PCT/US2009/055388, 12 pgs.

International Preliminary Report on Patentability dated Mar. 29, 2012, received in international patent application No. PCT/US2009/055388, 7 pgs.

European Search Report dated Mar. 15, 2013, received in European patent application No. 08829307.1, 6 pgs.

International Search Report and Written Opinion dated Mar. 5, 2013, received in international patent application No. PCT/US2012/062215, 12 pgs.

U.S. Appl. No. 16/933,414, filed Jul. 20, 2020.
U.S. Appl. No. 16/266,772, filed Feb. 4, 2019.
U.S. Appl. No. 15/488,942, filed Apr. 17, 2017.
U.S. Appl. No. 14/987,138, filed Jan. 4, 2016.
U.S. Appl. No. 14/492,681, filed Sep. 22, 2014.
U.S. Appl. No. 13/346,288, filed Jan. 9, 2012.
U.S. Appl. No. 13/047,125, filed Mar. 14, 2011.
U.S. Appl. No. 11/851,344, filed Sep. 6, 2007.
U.S. Appl. No. 11/276,548, filed Mar. 6, 2006.

* cited by examiner

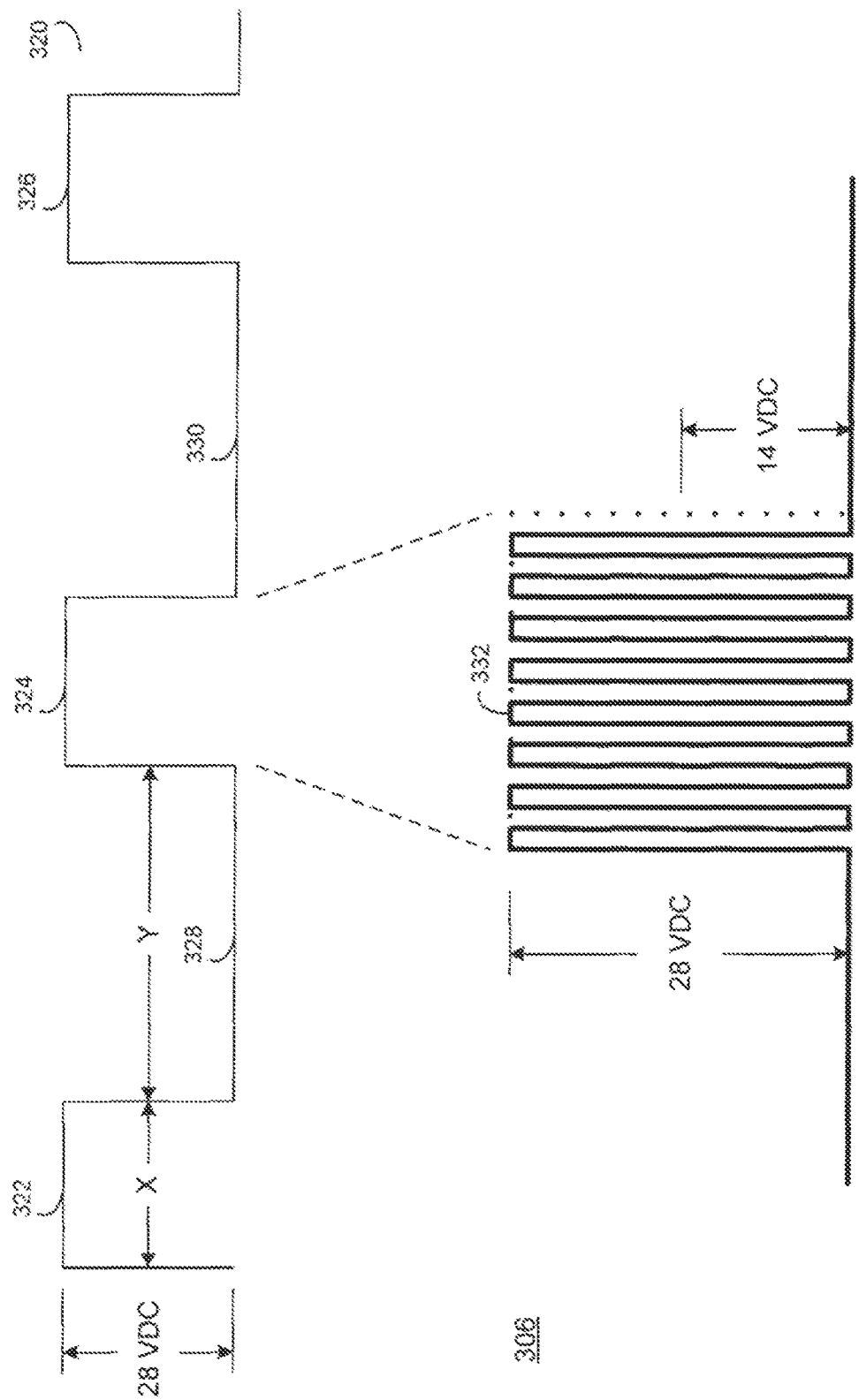

SYSTEM AND METHOD FOR GENERATING A DRIVE SIGNAL

CROSS-REFERENCE TO RELATED APPLICATIONS

The present application is a Continuation application of U.S. patent application Ser. No. 16/933,414, filed Jul. 20, 2020, and entitle System and Method for Generating a Drive Signal, now U.S. Pat. No. 11,214,476, issued Jan. 4, 2022, which is a Continuation application of U.S. patent application Ser. No. 16/266,772, filed Feb. 4, 2019, and entitled System and Method for Generating a Drive Signal, now U.S. Pat. No. 10,717,638, issued Jul. 21, 2020, which is a Continuation application of U.S. patent application Ser. No. 15/488,942, filed Apr. 17, 2017 and entitled System and Method for Generating a Drive Signal, now U.S. Pat. No. 10,196,257, issued Feb. 5, 2019, which is a Continuation application of U.S. patent application Ser. No. 14/987,138, filed Jan. 4, 2016 and entitled System and Method for Generating a Drive Signal, now U.S. Pat. No. 9,624,084, issued Apr. 18, 2017, which is a Continuation application of U.S. patent application Ser. No. 14/492,681, filed Sep. 22, 2014 and entitled System and Method for Generating a Drive Signal, now U.S. Pat. No. 9,227,826, issued Jan. 5, 2016, which is a Continuation application of U.S. patent application Ser. No. 13/346,288, filed Jan. 9, 2012 and entitled System And Method For Generating A Drive Signal, now U.S. Pat. No. 8,839,989, issued Sep. 23, 2014, which is a Continuation application of U.S. patent application Ser. No. 13/047,125, filed Mar. 14, 2011 and entitled System And Method For Generating A Drive Signal, now U.S. Pat. No. 8,091,736 issued Jan. 10, 2012, which is a Continuation application of U.S. patent application Ser. No. 11/851,344, filed Sep. 6, 2007 and entitled System And Method For Generating A Drive Signal, now U.S. Pat. No. 7,905,373 issued Mar. 15, 2011, which is a Continuation-in-Part application of U.S. patent application Ser. No. 11/276,548, filed Mar. 6, 2006 and entitled Pump System With Calibration Curve, now U.S. Pat. No. 7,740,152, issued Jun. 22, 2010, all of which are hereby incorporated herein by reference in their entireties.

TECHNICAL FIELD

This disclosure relates to dispensing machines and, more particularly, to food product dispensing machines.

BACKGROUND INFORMATION

Beverage dispensing machines typically combine one or more concentrated syrups (e.g. cola flavoring and a sweetener) with water (e.g., carbonated or non-carbonated water) to form a soft drink. Unfortunately, the variety of soft drinks offered by a particular beverage dispensing machine may be limited by the internal plumbing in the machine, which is often hard-plumbed and therefore non-configurable.

Accordingly, a typical beverage dispensing machine may include a container of concentrated cola syrup, a container of concentrated lemon-lime syrup, a container of concentrated root beer syrup, a water inlet (i.e. for attaching to a municipal water supply), and a carbonator (e.g. for converting noncarbonated municipal water into carbonated water).

Unfortunately, such beverage dispensing machines offer little in terms of product variety/customization. Additionally as the internal plumbing on such beverage dispensing machines is often hard-plumbed and the internal electronics are often hardwired, the ability of such beverage dispensing machines to offer a high level of variety/customization concerning beverage choices is often compromised.

SUMMARY

In a first implementation, a method includes defining a PWM drive signal having a defined voltage potential. The PWM drive signal has a plurality of "on" portions and a plurality of "off" portions that define a first duty cycle for regulating, at least in part, a flow rate of a pump assembly. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

One or more of the following features may be included. The pump assembly may be a solenoid piston pump. The pump assembly may be configured for use within a beverage dispensing system.

The pump assembly may be configured to releasably engage a product container. The pump assembly may be rigidly attached to a product module assembly. The defined voltage potential may be 28 VDC.

At least one of the "on" portions of the PWM drive signal may have a duration of approximately 15 milliseconds. At least one of the "off" portions of the PWM drive signal may have a duration within a range of 15-185 milliseconds. The second duty cycle may be within a range of 50-100%.

In another implementation, a computer program product resides on a computer readable medium that has a plurality of instructions stored on it. When executed by a processor, the instructions cause the processor to perform operations including defining a PWM drive signal having a defined voltage potential. The PWM drive signal has a plurality of "on" portions and a plurality of "off" portions that define a first duty cycle for regulating, at least in part, a flow rate of a pump assembly. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

One or more of the following features may be included. The pump assembly may be a solenoid piston pump. The pump assembly may be configured for use within a beverage dispensing system.

At least one of the "on" portions of the PWM drive signal may have a duration of approximately 15 milliseconds. At least one of the "off" portions of the PWM drive signal may have a duration within a range of 15-185 milliseconds. The second duty cycle may be within a range of 50-100%.

In another implementation, a method includes defining a PWM drive signal having a defined voltage potential. The PWM drive signal has a plurality of "on" portions and a plurality of "off" portions that define a first duty cycle for regulating, at least in part, a flow rate of a pump assembly included within a beverage dispensing system. At least a portion of the "on" portions of the PWM drive signal are pulse width modulated to define a second duty cycle for the at least a portion of the "on" portions of the PWM drive signal. The second duty cycle regulates, at least in part, the percentage of the defined voltage potential applied to the pump assembly.

One or more of the following features may be included. The pump assembly may be a solenoid piston pump. The pump assembly may be configured to releasably engage a product container. The pump assembly may be rigidly attached to a product module assembly. At least one of the "on" portions of the PWM drive signal may have a duration of approximately 15 milliseconds. At least one of the "off" portions of the PWM drive signal may have a duration within a range of 15-185 milliseconds. The second duty cycle may be within a range of 50-100%.

The details of one or more implementations are set forth in the accompanying drawings and the description below. Other features and advantages will become apparent from the description, the drawings and the claims.

BRIEF DESCRIPTION OF THE DRAWINGS

FIG. 4C is a diagrammatic view of a drive signal as applied to a pump assembly included within the micro ingredient subsystem of FIG. 4A;

Like reference symbols in the various drawings indicate like elements.

DETAILED DESCRIPTION OF THE EXEMPLARY EMBODIMENTS

Figure 1:
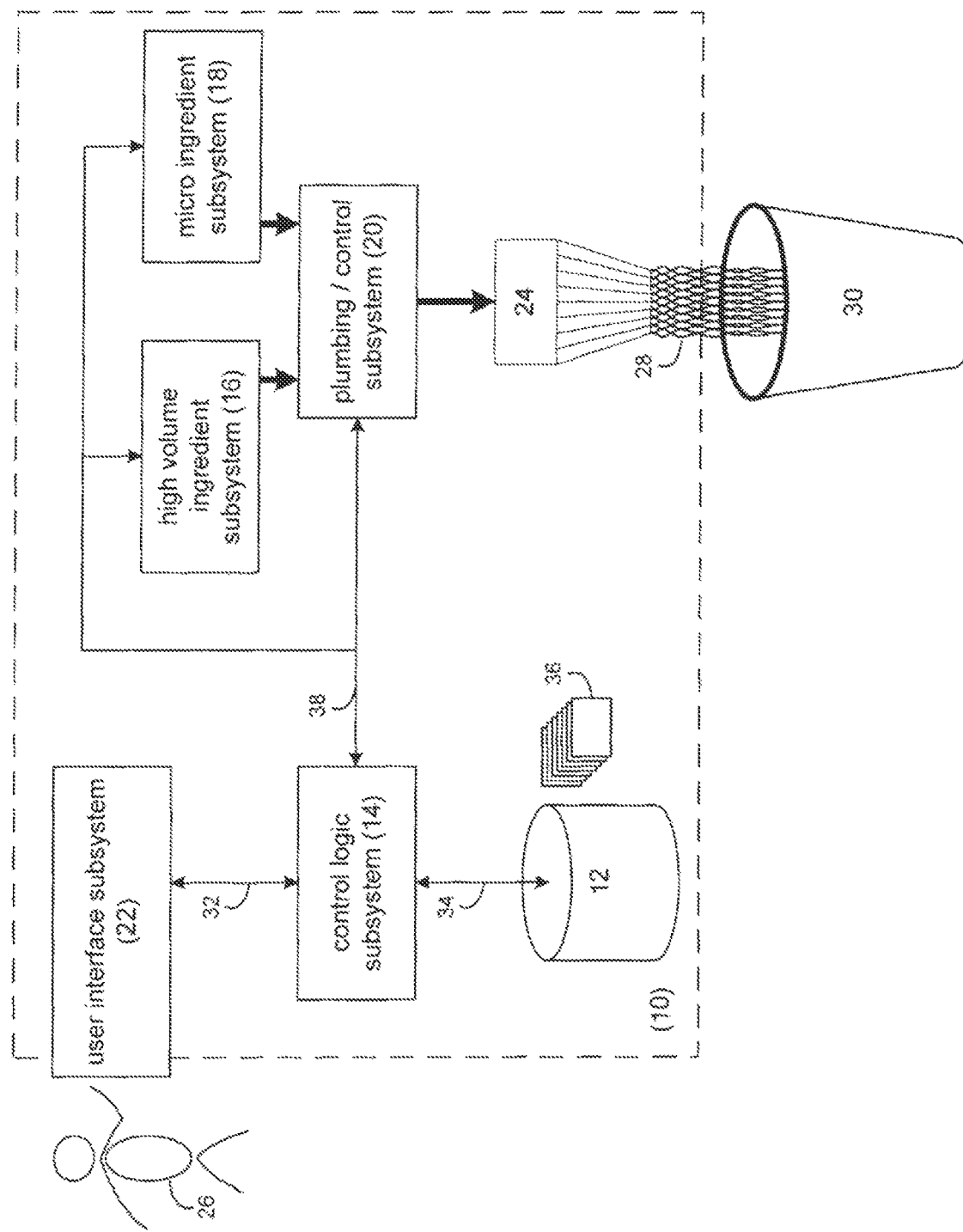
FIG. 1 is a diagrammatic view of a beverage dispensing system.

Referring to FIG. 1, there is shown a generalized-view of beverage dispensing system 10 that is shown to include a plurality of subsystems namely: storage subsystem 12, control logic subsystem 14, high volume ingredient subsystem 16, micro-ingredient subsystem 18, plumbing/control subsystem 20, user interface subsystem 22, and nozzle 24. Each of the above describes subsystems 12, 14, 16, 18, 20, 22 will be described below in greater detail.

During use of beverage dispensing system 10, user 26 may select a particular beverage 28 for dispensing (into container 30) using user interface subsystem 22. Via user interface subsystem 22, user 26 may select one or more options for inclusion within such beverage. For example, options may include but are not limited to the addition of one or more flavorings (e.g. lemon flavoring, lime flavoring, chocolate flavoring, and vanilla flavoring) into a beverage; the addition of one or more nutraceuticals (e.g. Vitamin A, Vitamin C, Vitamin D, Vitamin E, Vitamin $B_6$, Vitamin $B_{12}$, and Zinc) into a beverage; the addition of one or more other beverages (e.g. coffee, milk, lemonade, and iced tea) into a beverage; and the addition of one or more food products (e.g. ice cream) into a beverage.

Once user 26 makes the appropriate selections, via user interface subsystem 22, user interface subsystem 22 may send the appropriate data signals (via data bus 32) to control logic subsystem 14. Control logic subsystem 14 may process these data signals and may retrieve (via data bus 34) one or more recipes chosen from plurality of recipes 36 maintained on storage subsystem 12. Upon retrieving the recipe(s) from storage subsystem 12, control logic subsystem 14 may process the recipe(s) and provide the appropriate control signals (via data bus 38) to e.g. high volume ingredient subsystem 16 micro-ingredient subsystem 18 and plumbing/control subsystem 20, resulting in the production of beverage 28 (which is dispensed into container 30).

Figure 2:
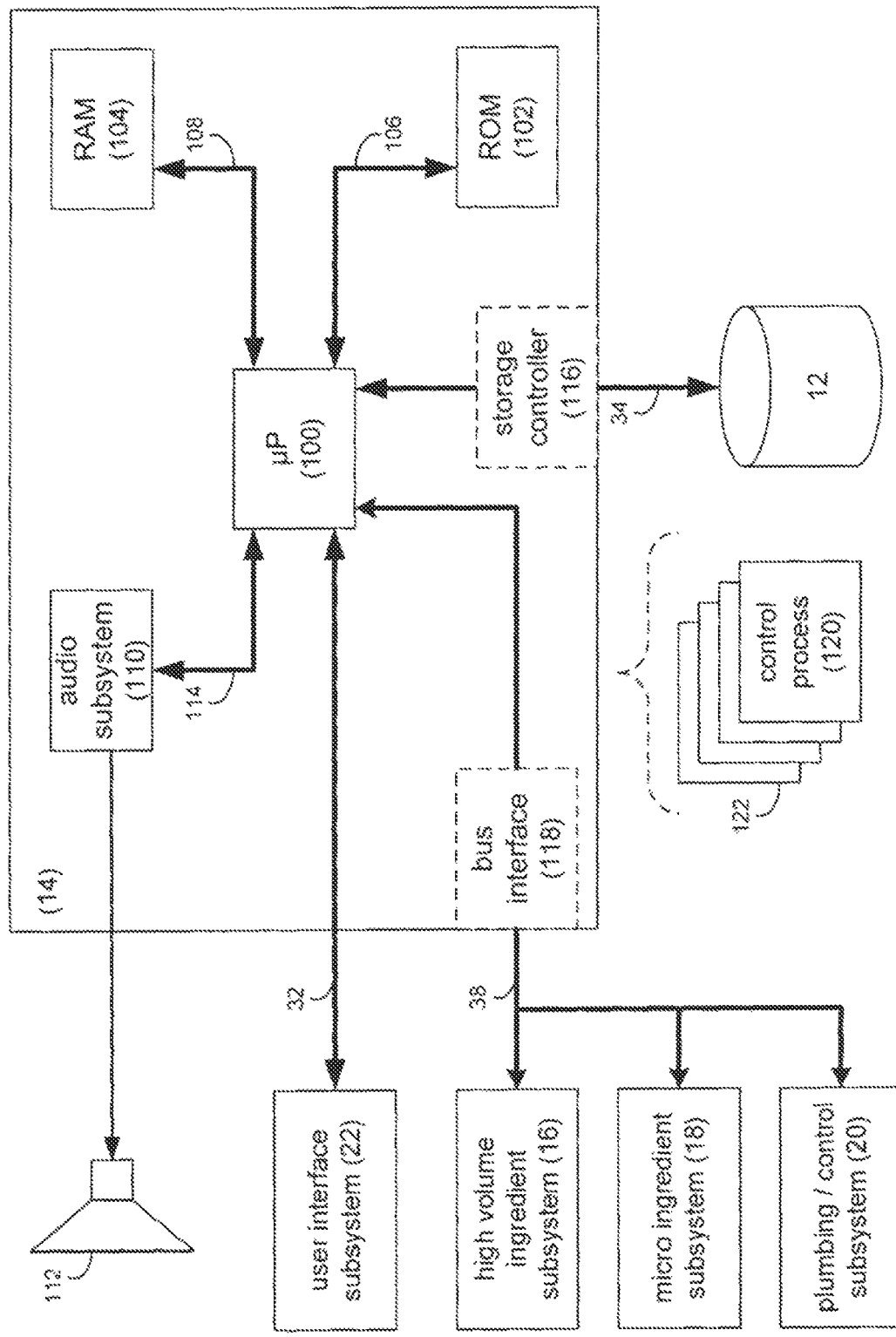
FIG. 2 is a diagrammatic view of a control logic subsystem included within the beverage dispensing system of FIG. 1.

Referring also to FIG. 2, a diagrammatic view of control logic subsystem 14 is shown. Control logic subsystem 14 may include microprocessor 100 (e.g., an ARM™ microprocessor produced by Intel Corporation of Santa Clara, Calif.), nonvolatile memory (e.g. read only memory 102), and volatile memory (e.g. random access memory 104); each of which may be interconnected via one or more data/system buses 106, 108. As discussed above, user interface subsystem 22 may be coupled to control logic subsystem 14 via data bus 32.

Control logic subsystem 14 may also include an audio subsystem 110 for providing e.g. an analog audio signal to speaker 112, which may be incorporated into beverage dispensing system 10. Audio subsystem 110 may be coupled to microprocessor 100 via data/system bus 114.

Control logic subsystem 14 may execute an operating system, examples of which may include but are not limited to Microsoft Windows CE™, Redhat Linux™, Palm OS™, or a device-specific (i.e., custom) operating system.

The instruction sets and subroutines of the above-described operating system, which may be stored on storage subsystem 12, may be executed by one or more processors (e.g. microprocessor 100) and one or more memory architectures (e.g. read-only memory 102 and/or random access memory 104) incorporated into control logic subsystem 14.

Storage subsystem 12 may include, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

As discussed above, storage subsystem 12 may be coupled to control logic subsystem 14 via data bus 34. Control logic subsystem 14 may also include storage controller 116 (shown in phantom) for converting signals provided by microprocessor 100 into a format usable by storage system 12. Further, storage controller 116 may convert signals provided by storage subsystem 12 into a format usable by microprocessor 100.

As discussed above, high-volume ingredient subsystem 16, micro-ingredient subsystem 18 and/or plumbing/control subsystem 20 may be coupled to control logic subsystem 14 via data bus 38. Control logic subsystem 14 may include bus interface 118 (shown in phantom) for converting signals provided by microprocessor 100 into a format usable by high-volume ingredient subsystem 16, micro-ingredient subsystem 18 and/or plumbing/control subsystem 20. Further, bus interface 118 may convert signals provided by high-volume ingredient subsystem 16, micro-ingredient subsystem 18 and/or plumbing/control subsystem 20 into a format usable by microprocessor 100.

As will be discussed below in greater detail, control logic subsystem 14 may execute one or more control processes 120 that may control the operation of beverage dispensing system 10. The instruction sets and subroutines of control processes 120, which may be stored on storage subsystem 12, may be executed by one or more processors (e.g.

microprocessor 100) and one or more memory architectures (e.g. read-only memory 102 and/or random access memory 104) incorporated into control logic subsystem 14.

Figure 3:
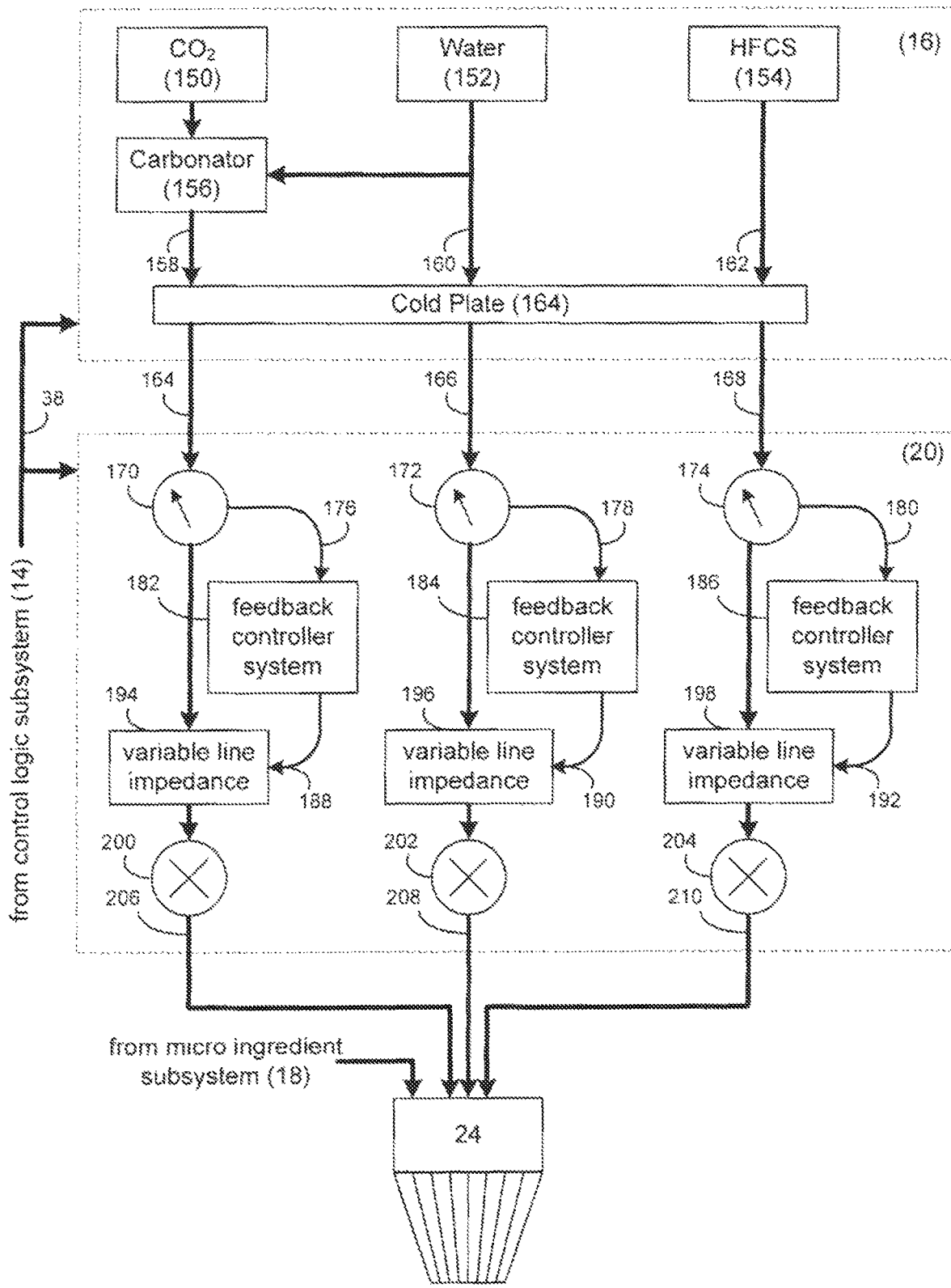
FIG. 3 is a diagrammatic view of a high volume ingredient subsystem included within the beverage dispensing system of FIG. 1.

Referring also to FIG. 3, a diagrammatic view of high-volume ingredient subsystem 16 and plumbing/control subsystem 20 are shown. High-volume ingredient subsystem 16 may include containers for housing consumables that are used at a rapid rate when making beverage 28. For example, high-volume ingredient subsystem 16 may include carbon dioxide supply 150, water supply 152, and high fructose corn syrup supply 154. An example of carbon dioxide supply 150 may include but is not limited to a tank (not shown) of compressed, gaseous carbon dioxide. An example of water supply 152 may include but is not limited to a municipal water supply (not shown). An example of high fructose corn syrup supply 154 may include but is not limited to a tank (not shown) of highly-concentrated, high fructose corn syrup.

High-volume, ingredient subsystem 16 may include a carbonator 156 for generating carbonated water from carbon dioxide gas (provided by carbon dioxide supply 150) and water (provided by water supply 152). Carbonated water 158, water 160 and high fructose corn syrup 162 may be provided to cold plate assembly 164. Cold plate assembly 164 may be designed to chill carbonated water 158, water 160, and high fructose corn syrup 162 down to a desired serving temperature (e.g. 40° F.).

While a single cold plate 164 is shown to chill carbonated water 158, water 160, and high fructose corn syrup 162, this is for illustrative purposes only and is not intended to be a limitation of disclosure, as other configurations are possible. For example, an individual cold plate may be used to chill each of carbonated water 158, water 160 and high fructose corn syrup 162. Once chilled, chilled carbonated water 164, chilled water 166, and chilled high fructose corn syrup 168 may be provided to plumbing/control subsystem 20.

For illustrative purposes, plumbing/control subsystem 20 is shown to include three flow measuring devices 170, 172, 174, which measure the volume of chilled carbonated water 164, chilled water 166 and chilled high fructose corn syrup 168 (respectively). Flow measuring devices 170, 172, 174 may provide feedback signals 176, 178, 180 (respectively) to feedback controller systems 182, 184, 186 (respectively).

Feedback controller systems 182, 184, 186 (which will be discussed below in greater detail) may compare flow feedback signals 176, 178, 180 to the desired flow volume (as defined for each of chilled carbonated water 164, chilled water 166 and chilled high fructose corn syrup 168; respectively). Upon processing flow feedback signals 176, 178, 180, feedback controller systems 182, 184, 186 (respectively) may generate flow control signals 188, 190, 192 (respectively) that may be provided to variable line impedances 194, 196, 198 (respectively). Examples of variable line impedance 194, 196, 198 are disclosed and claimed in U.S. Pat. No. 5,755,683 (Attached hereto as Appendix A), U.S. patent application Ser. No. 11/559,792 (Attached hereto as Appendix B) and U.S. patent application Ser. No. 11/851,276 (Attached hereto as Appendix C). Variable line impedances 194, 196, 198 may regulate the flow of chilled carbonated water 164, chilled water 166 and chilled high fructose corn syrup 168 passing through lines 206, 208, 210 (respectively), which are provided to nozzle 24 and (subsequently) container 30.

Lines 206, 208, 210 may additionally include solenoid valves 200, 202, 204 (respectively) for preventing the flow of fluid through lines 206, 208, 210 during times when fluid flow is not desired/required (e.g. during shipping, maintenance procedures, and downtime).

As discussed above, FIG. 3 merely provides an illustrative view of plumbing/control subsystem 20. Accordingly, the manner in which plumbing/control subsystem 20 is illustrated is not intended to be a limitation of this disclosure, as other configurations are possible. For example, some or all of the functionality of feedback controller systems 182, 184, 186 may be incorporated into control logic subsystem 14.

Figure 4A:
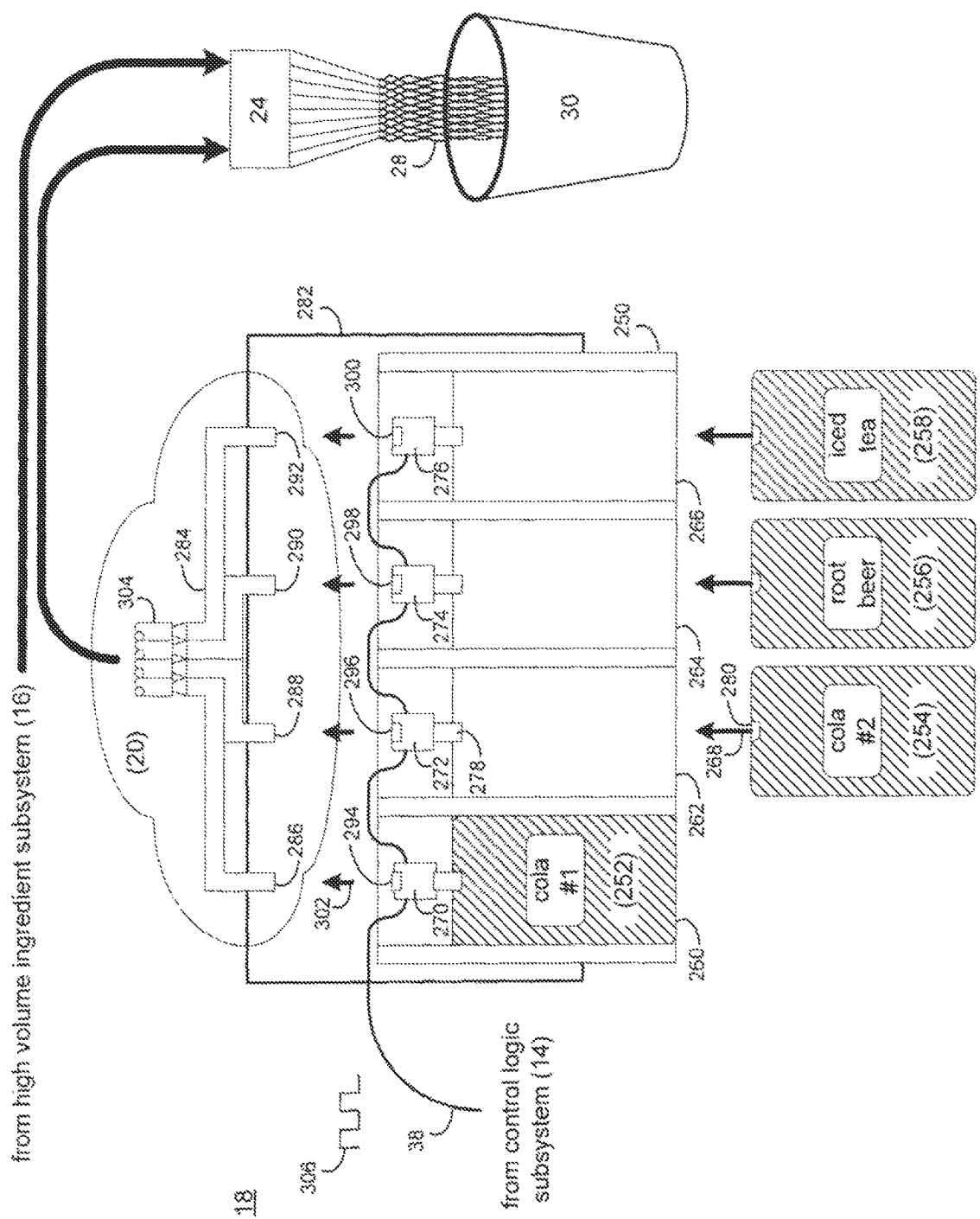
FIG. 4A is a diagrammatic view of a micro ingredient subsystem included within the beverage dispensing system of FIG. 1.

Referring also to FIG. 4A, a diagrammatic top-view of micro-ingredient subsystem 18 and plumbing/control subsystem 20 is shown. Micro-ingredient subsystem 18 may include product module assembly 250, which may be configured to releasably engage one or more product containers 252, 254, 256, 258, which may be configured to hold micro-ingredients for use when making beverage 28. Examples of such micro-ingredients may include but are not limited to a first portion of a cola syrup, a second portion of a cola syrup, a root beer syrup, and an iced tea syrup.

Product module assembly 250 may include a plurality of slot assemblies 260, 262, 264, 266 configured to releasably engage plurality of product containers 252, 254, 256, 258. In this particular example, product module assembly 250 is shown to include four slot assemblies (namely slots 260, 262, 264, 266) and, therefore, may be referred to as a quad product module assembly. When positioning one or more of product containers 252, 254, 256, 258 within product module assembly 250, a product container (e.g. product container 254) may be slid into a slot assembly (e.g. slot assembly 262) in the direction of arrow 268.

For illustrative purposes, each slot assembly of product module assembly 250 is shown to include a pump assembly. For example, slot assembly 252 shown to include pump assembly 270; slot assembly 262 shown to include pump assembly 272; slot assembly 264 is shown to include pump assembly 274; and slot assembly 266 is shown to include pump assembly 276.

Each of pump assemblies 270, 272, 274, 276 may include an inlet port for releasably engaging a product orifice included within the product container. For example, pump assembly 272 a shown to include inlet port 278 that is configured to releasably engage container orifice 280 included within product container 254. Inlet port 278 and/or product orifice 280 may include one or more O-ring assemblies (not shown) to facilitate a leakproof seal.

An example of one or more of pump assembly 270, 272, 274, 276 may include but is not limited to a solenoid piston pump assembly that provides a defined and consistent amount of fluid each time that one or more of pump assemblies 270, 272, 274, 276 are energized. Such pumps are available from ULKA Costruzioni Elettromeccaniche S.p.A. of Pavia, Italy. For example, each time a pump assembly (e.g. pump assembly 274) is energized by control logic subsystem 14 via data bus 38, the pump assembly may provide 1.00 mL of the root beer syrup included within product container 256.

Other examples of pump assemblies 270, 272, 274, 276 and various pumping techniques are described in U.S. Pat. No. 4,808,161 (Attached hereto as Appendix D); U.S. Pat. No. 4,826,482 (Attached hereto as Appendix E); U.S. Pat. No. 4,976,162 (Attached hereto as Appendix F); U.S. Pat. No. 5,088,515 (Attached hereto as Appendix G); and U.S. Pat. No. 5,350,357 (Attached hereto as Appendix H).

Product module assembly 250 may be configured to releasably engage bracket assembly 282. Bracket assembly 282 may be a portion of (and rigidly fixed within) beverage dispensing system 10. An example of bracket assembly 282 may include but is not limited to a shelf within beverage dispensing system 10 that is configured to releasably engage product module 250. For example, product module 250 may include a engagement device (e.g. a clip assembly, a slot assembly, a latch assembly, a pin assembly; not shown) that is configured to releasably engage a complementary device that is incorporated into bracket assembly 282.

Plumbing/control subsystem 20 may include manifold assembly 284 that may be rigidly affixed to bracket assembly 282. Manifold assembly 284 may be configured to include a plurality of inlet ports 286, 288, 290, 292 that are configured to releasably engage a pump orifice (e.g. pump orifices 294, 296, 298, 300) incorporated into each of pump assemblies 270, 272, 274, 276. When positioning product module 250 on bracket assembly 282, product module 250 may be moved in the direction of the arrow 302, thus allowing for inlet ports 286, 288, 290, 292 to releasably engage pump orifices 294, 296, 298, 300. Inlet ports 286, 288, 290, 292 and/or pump orifices 294, 296, 298, 300 may include one or more O-ring assemblies (not shown) to facilitate a leakproof seal.

Manifold assembly 284 may be configured to engage tubing bundle 304, which may be plumbed (either directly or indirectly) to nozzle 24. As discussed above, high-volume ingredient subsystem 16 also provides fluids in the form of chilled carbonated water 164, chilled water 166 and/or chilled high fructose corn syrup 168 (either directly or indirectly) to nozzle 24. Accordingly, as control logic subsystem 14 may regulate (in this particular example) the specific quantities of e.g. chilled carbonated water 164, chilled water 166, chilled high fructose corn syrup 168 and the quantities of the various micro ingredients (e.g. a first portion of a cola syrup, a second portion of a cola syrup, a root beer syrup, and an iced tea syrup), control logic subsystem 14 may accurately control the makeup of beverage 28.

Figure 4B:
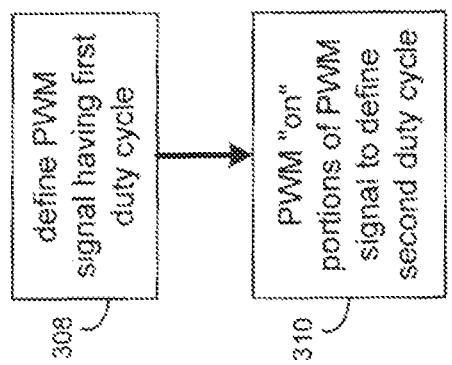
FIG. 4B is a flowchart of a process executed by the control logic subsystem of FIG. 2.

Referring also to FIGS. 4B & 4C and as discussed above, one or more of pump assemblies 270, 272, 274, 276 may be a solenoid piston pump assembly that provides a defined and consistent amount of fluid each time that one or more of pump assemblies 270, 272, 274, 276 are energized by control logic subsystem 14 (via data bus 38). Further and as discussed above, control logic subsystem 14 may execute one or more control processes 120 that may control the operation of beverage dispensing system 10. Accordingly, control logic subsystem 14 may execute a drive signal generation process 122 for generating drive signal 306 that may be provided from control logic subsystem 14 to pump assemblies 270, 272, 274, 276 via data bus 38.

As discussed above, once user 26 makes one or more selections, via user interface subsystem 22, user interface subsystem 22 may provide the appropriate data signals (via data bus 32) to control logic subsystem 14. Control logic subsystem 14 may process these data signals and may retrieve (via data bus 34) one or more recipes chosen from plurality of recipes 36 maintained on storage subsystem 12. Upon retrieving the recipe(s) from storage subsystem 12, control logic subsystem 14 may process the recipe(s) and provide the appropriate control signals (via data bus 38) to e.g. high volume ingredient subsystem 16, micro-ingredient subsystem 18 and plumbing/control subsystem 20, resulting in the production of beverage 28 (which is dispensed into container 30). Accordingly, the control signals received by pump assemblies 270, 272, 274, 276 (via data bus 38) may define the particular quantities of micro-ingredients to be included within beverage 28. Specifically, being that pump assemblies 270, 272, 274, 276 (as discussed above) provide a defined and consistent amount of fluid each time that a pump assembly is energized, by controlling the amount of times that the pump assembly is energized, control logic subsystem 14 may control the quantity of fluid (e.g., micro ingredients) included within beverage 28.

When generating drive signal 306, drive signal generation process 122 may define 308 a pulse width modulated (i.e., PWM) drive signal 320 having a defined voltage potential. An example of such a defined voltage potential is 28 VDC. PWM drive signal 320 may include a plurality of "on" portions (e.g., portions 322, 324, 326) and a plurality of "off" portions (e.g., portions 328, 330) that define a first duty cycle for regulating, at least in part, the flow rate of the pump assembly (e.g., pump assemblies 270, 272, 274, 276). In this particular example, the duration of the "on" portion is "X" and the duration of the "off" portion is "Y". A typical value for "X" may include but is not limited to approximately 15 milliseconds. A typical value for "Y" may include but is not limited to 15-185 milliseconds. Accordingly, examples of the duty cycle of PWM drive signal 320 may range from 50.0% (i.e., 15 ms/30 ms)) to 7.5% (i.e., 15 ms/200 ms). Accordingly, if a pump assembly (e.g., pump assemblies 270, 272, 274, 276) requires 15 ms of energy to provide 1.00 mL of the root beer syrup (as discussed above), a duty cycle of 50.0% may result in the pump assembly having a flow rate of 33.33 mL per second. However, adjusting the duty cycle down to 7.5% may result in the pump assembly having a flow rate of 5.00 mL per second. Accordingly. by varying the duty cycle of PWM drive signal 320, the flow rate of the pump assembly (e.g., pump assemblies 270, 272, 274, 276) may be varied.

As some fluids are more viscous than other fluids, some fluids may require additional energy when pumping. Accordingly, drive signal generation process 122 may pulse width modulate 310 at least a portion of the "on" portions of PWM drive signal 320 to define a second duty cycle for at least a portion of the "on" portions of PWM drive signal 320, thus generating drive signal 306. As will be discussed below, the second duty cycle may regulate, at least in part, the percentage of the defined voltage potential applied to the pump assembly.

For example, assume that a pump assembly (e.g., pump assemblies 270, 272, 274, 276) is pumping a low viscosity fluid (e.g., vanilla extract). As discussed above, the amount of work that the pump assembly will be required to perform is less than the amount of work required to pump a more viscous fluid (e.g., root beer syrup). Accordingly, drive signal generation process 122 may reduce the duty cycle of the "on" portion (e.g., "on" portion 322, 324, 326) to e.g., 50%, thus lowering the effective voltage to approximately 14.0 VDC (i.e., 50% of the full 28.0 VDC voltage potential). Alternatively, when pumping fluid having a higher viscosity, the duty cycle of the "on" portion (e.g., "on" portion 322, 324, 326) may be increased, thus raising the effective voltage to between 14.0 VDC and 28.0 VDC).

The duration of an "on" portion that results from the second pulse width modulation process may be substantially shorter than the duration of the "on" portion that results from the first pulse width modulation process. For example, assuming that "on" portion 324 has a duration of 15 milliseconds, "on" portion 332 (which is within "on" portion 324) is shown in this illustrative example to have a duration of $^{15}/_{16}$ of a millisecond.

Figure 5:
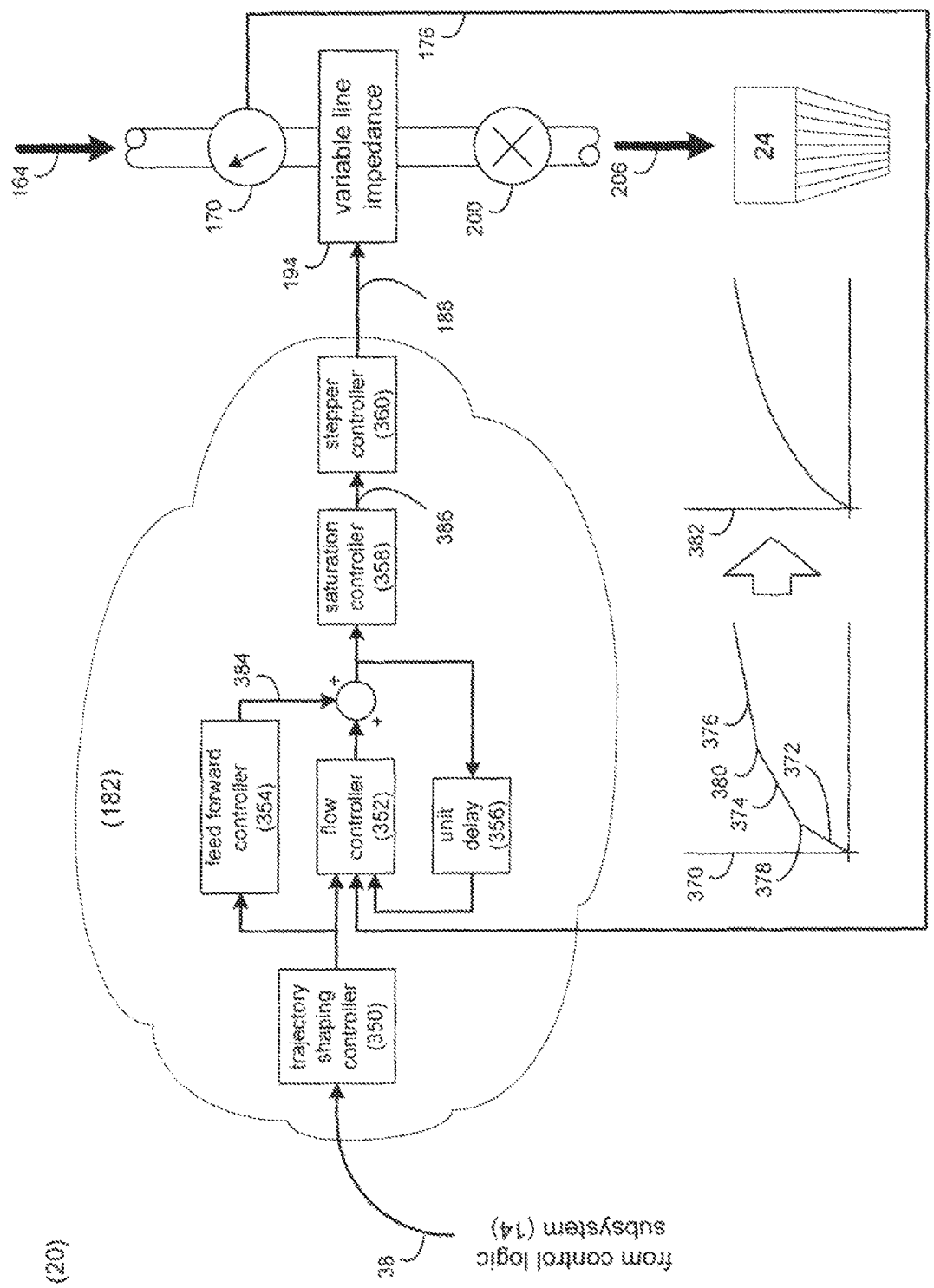
FIG. 5 is a diagrammatic view of a plumbing/control subsystem included within the beverage dispensing system of FIG. 1.

Referring also to FIG. 5, a diagrammatic view of plumbing/control subsystem 20 is shown. While the plumbing/control subsystem described below concerns the plumbing/control system used to control the quantity of chilled carbonated water 164 being added to beverage 28, this is for illustrative purposes only and is not intended to be a limitation of this disclosure, as other configurations are also possible. For example, the plumbing/control subsystem described below may also be used to control e.g., the quantity of chilled water 166 and/or chilled high fructose corn syrup 168 being added to beverage 28.

As discussed above, plumbing/control subsystem 20 may include feedback controller system 182 that receives flow feedback signal 176 from flow measuring device 170. Feedback controller system 182 may compare flow feedback signal 176 to the desired flow volume (as defined by control logic subsystem 14 via data bus 38). Upon processing flow feedback signal 176, feedback controller system 182 may generate flow control signal 188 that may be provided to variable line impedance 194.

Feedback controller system 182 may include trajectory shaping controller 350, flow regulator 352, feed forward controller 354, unit delay 356, saturation controller 358, and stepper controller 360, each of which will be discussed below in greater detail.

Trajectory shaping controller 350 may be configured to receive a control signal from control logic subsystem 14 via data bus 38. This control signal may define a trajectory for the manner in which plumbing/control subsystem 20 is supposed to deliver fluid (in the case, chilled carbonated water 164) for use in beverage 28. However, the trajectory provided by control logic subsystem 14 may need to be modified prior to being processed by e.g., flow controller 352. For example, control systems tend to have a difficult time processing control curves that are made up of a plurality of linear line segments (i.e., that include step changes). For example, flow regulator 352 may have difficulty processing control curve 370, as it consists of three distinct linear segments, namely segments 372, 374, 376. Accordingly, at the transition points (e.g., transition points 378, 380), flow controller 352 specifically (and plumbing/control subsystem 20 generally) would be required to instantaneously change from a first flow rate to a second flow rate. Therefore, trajectory shaping controller 350 may filter control curve 30 to form smoothed control curve 382 that is more easily processed by flow controller 352 specifically (and plumbing/control subsystem 20 generally), as an instantaneous transition from a first flow rate to a second flow rate is no longer required.

Additionally, trajectory shaping controller 350 may allow for the pre-fill wetting and post-fill rinsing of nozzle 20. Specifically, in the event that nozzle 28 is pre-fill wetted with 10 mL of water prior to adding syrup and/or post-fill rinsed with 10 mL of water once the adding of syrup has stopped, trajectory shaping controller 350 may offset the water added during the pre-fill wetting and/or post-fill rinsing by providing an additional quantity of syrup during the fill process. Specifically, as container 30 is being filled with beverage 28, the pre-fill rinse water may result in beverage 28 being initially under-sweetened. Trajectory shaping controller 350 may then add syrup at a higher-than-needed flow rate, resulting in beverage 30 transitioning from under-sweetened to appropriately-sweetened to over-sweetened. However, once the appropriate amount of syrup has been added, the post-fill rinse process may add additional water, resulting in beverage 28 once again becoming appropriately-sweetened.

Flow controller 352 may be configured as a proportional-integral (PI) loop controller. Flow controller 352 may perform the comparison and processing that was generally described above as being performed by feedback controller system 182. For example, flow controller 352 may be configured to receive feedback signal 176 from flow measuring device 170. Flow controller 352 may compare flow feedback signal 176 to the desired flow volume (as defined by control logic subsystem 14 and modified by trajectory shaping controller 350). Upon processing flow feedback signal 176, flow controller 352 may generate flow control signal 188 that may be provided to variable line impedance 194.

Feed forward controller 354 may provide an "best guess" estimate concerning what the initial position of variable line impedance 194 should be. Specifically, assume that at a defined constant pressure, variable line impedance has a flow rate (for chilled carbonated water 164) of between 0.00 mL/second and 120.00 mL/second. Further, assume that a flow rate of 40 mL/second is desired when filing container 30 with beverage 28. Accordingly, feed forward controller 354 may provide a feed forward signal (on feed forward line 384) that initially opens variable line impedance 194 to 33.33% of its maximum opening (assuming that variable line impedance 194 operates in a linear fashion).

When determining the value of the feed forward signal, feed forward controller 354 may utilize a lookup table (not shown) that may be developed empirically and may define the signal to be provided for various initial flow rates. An example of such a lookup table may include, but is not limited to, the following table:

| Flowrate $_{mL/second}$ | Signal $_{to\ stepper\ controller}$ |
|---|---|
| 0 | pulse to 0 degrees |
| 20 | pulse to 30 degrees |
| 40 | pulse to 60 degrees |
| 60 | pulse to 150 degrees |
| 80 | pulse to 240 degrees |
| 100 | pulse to 270 degrees |
| 120 | pulse to 300 degrees |

Again, assuming that a flow rate of 40 mL/second is desired when filing container 30 with beverage 28, feed forward controller 354 may utilize the above-described lookup table and may pulse the stepper motor to 60.0 degrees (using feed forward line 384).

Unit delay 356 may form a feedback path through which a previous version of the control signal (provided to variable line impedance 194) is provided to flow controller 352.

Saturation controller 358 may be configured to disable the integral control of feedback controller system 182 (which, as discussed above, may be configured as a PI loop controller) whenever variable line impedance 194 is set to a maximum flow rate (by stepper controller 360), thus increasing the stability of the system by reducing flow rate overshoots and system oscillations.

Stepper controller 360 may be configured to convert the signal provided by saturation controller 358 (on line 386) into a signal usable by variable line impedance 194. Variable line impedance 194 may include a stepper motor for adjusting the orifice size (and, therefore, the flow rate) of variable line impedance 194. Accordingly, control signal 188 may be configured to control the stepper motor included within variable line impedance.

Figure 6:
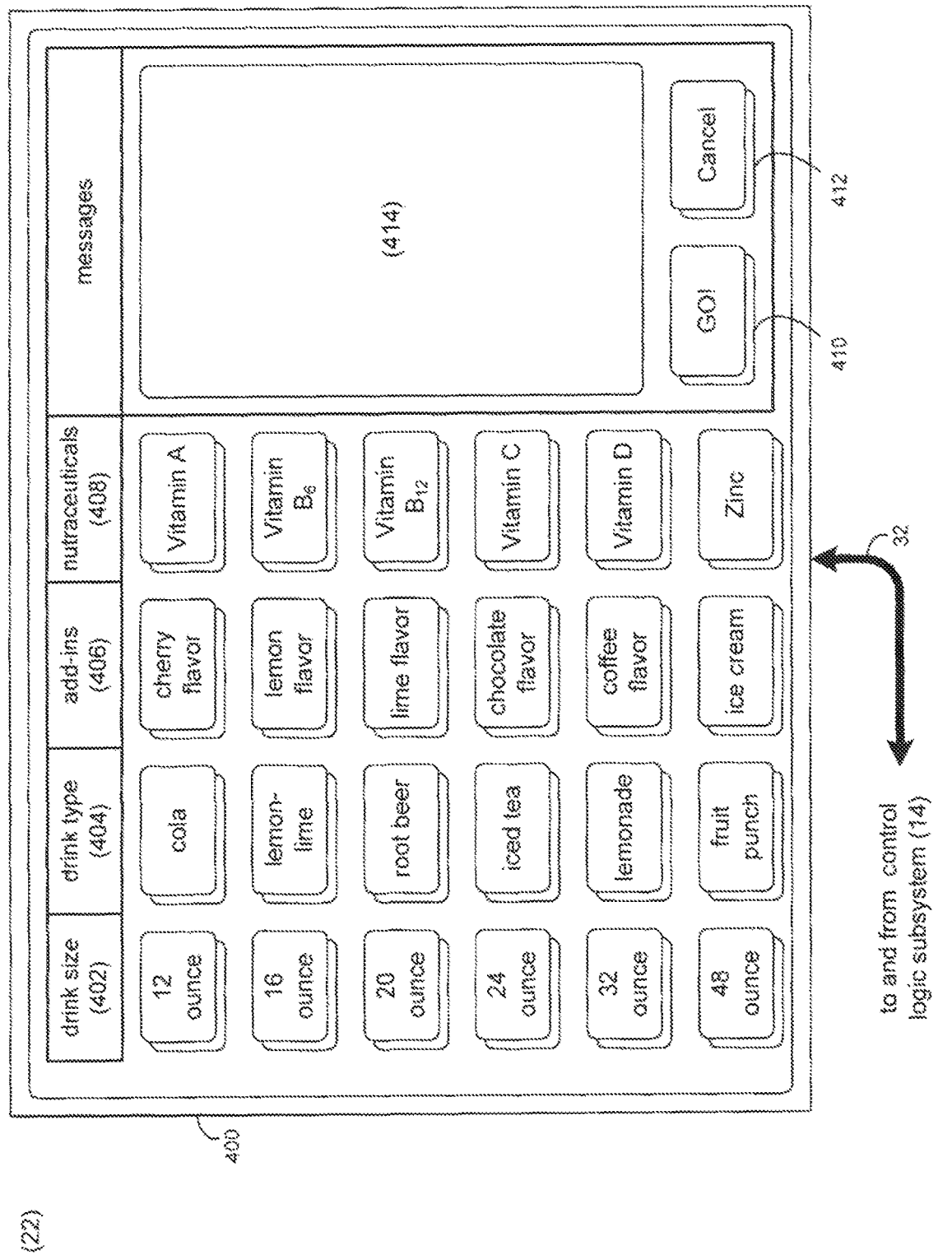
FIG. 6 is a diagrammatic view of a user interface subsystem included within the beverage dispensing system of FIG. 1.

Referring also to FIG. 6, a diagrammatic view of user interface subsystem 22 is shown. User interface subsystem 22 may include touch screen interface 400 that allows user 26 to select various options concerning beverage 28. For example, user 26 (via "drink size" column 402) may be able to select the size of beverage 28. Examples of the selectable sizes may include but are not limited to: "12 ounce"; "16 ounce"; "20 ounce"; "24 ounce"; "32 ounce"; and "48 ounce".

User 26 may be able to select (via "drink type" column 404) the type of beverage 28. Examples of the selectable types may include but are not limited to: "cola"; "lemon-lime"; "root beer"; "iced tea"; "lemonade"; and "fruit punch".

User 26 may also be able to select (via "add-ins" column 406) one or more flavorings/products for inclusion within beverage 28. Examples of the selectable add-ins may include but are not limited to: "cherry flavor"; "lemon flavor"; "lime flavor"; "chocolate flavor"; "coffee flavor"; and "ice cream".

Further, user 26 may be able to select (via "nutraceuticals" column 408) one or more nutraceuticals for inclusion within beverage 28. Examples of such nutraceuticals may include but are not limited to: "Vitamin A"; "Vitamin $B_6$"; "Vitamin $B_{12}$"; "Vitamin C"; "Vitamin D"; and "Zinc".

Once user 26 has made the appropriate selections, user 26 may select "GO!" button 410 and user interface subsystem 22 may provide the appropriate data signals (via data bus 32) to control logic subsystem 14. Once received, control logic subsystem 14 may retrieve the appropriate data from storage subsystem 12 and may provide the appropriate control signals to e.g., high volume ingredient subsystem 16, micro ingredient subsystem 18, and plumbing/control subsystem 20, which may be processed (in the manner discussed above) to prepare beverage 28. Alternatively, user 26 may select "Cancel" button 412 and touch screen interface 400 may be reset to a default state (e.g., no buttons selected).

User interface subsystem 22 may be configured to allow for bidirectional communication with user 26. For example, user interface subsystem 22 may include informational screen 414 that allows beverage dispensing system 10 to provide information to user 26. Examples of the types of information that may be provided to user 26 may include but is not limited to advertisements, information concerning system malfunctions/warnings, and information concerning the cost of various products.

All or a portion of the above-described pulse width modulating techniques may be used to maintain a constant velocity at a nozzle (e.g., nozzle 24). For example, the supply of high fructose corn syrup may be pulse width modulated (using e.g., a variable line impedance or a solenoid valve) so that the high fructose corn syrup is injected into nozzle 24 in high-velocity bursts, thus resulting in a high level of mixing between the high fructose corn syrup and the other components of the beverage.

While the system is described above as being utilized within a beverage dispensing system, this is for illustrative purposes only and is not intended to be a limitation of this disclosure, as other configurations are possible. For example, the above-described system may be utilized for processing/dispensing other consumable products (e.g., ice cream and alcoholic drinks). Additionally, the above-described system may be utilized in areas outside of the food industry. For example, the above-described system may be utilized for processing/dispensing: vitamins; pharmaceuticals; medical products, cleaning products; lubricants; painting/staining products; and other non-consumable liquids/semi-liquids/granular solids.

A number of implementations have been described. Nevertheless, it will be understood that various modifications may be made. Accordingly, other implementations are within the scope of the following claims.

What is claimed is:

1. A method of for controlling the flow rate of a plurality of fluids though a dispensing system having a user interface, a controller, and a plurality of pumps comprising:
   receiving a user selection at the user interface and transmitting a selection signal to the controller;
   generating a first off pump drive signal having a first voltage for a first cycle of periodic off times;
   transmitting the first pump drive signal from the controller to a first pump;
   generating a first on pump drive signal for a second cycle of periodic on times wherein during the periodic on times the on pump drive signal periodically alternates between the first voltage and the voltage potential of a second voltage to generate an effective third voltage between the first voltage and the second voltage;
   transmitting the first pump on signal from the controller to the first pump;
   generating a second off pump drive signal having a first voltage for a first cycle of periodic off times;
   transmitting the second off pump signal from the controller to a second pump;
   generating a second on pump drive signal for a second cycle of periodic on times wherein during the periodic on times the on pump drive signal periodically alternates between the first voltage and the voltage potential of a second voltage to generate an effective third voltage between the first voltage and the second voltage; and
   transmitting the second off pump signal from the controller to the second pump.

2. The pump control method of claim 1 wherein the effective third voltages are one half the potential between the first voltages and the second voltages for the first and second on pump drive signals.

3. The pump control method of claim 1 wherein the cycle of periodic off times for the first and second pumps are about 15 milliseconds.

4. The pump control method of claim 1 wherein the cycle of periodic on times for the first and second pumps are between about 15 and 185 milliseconds.

5. The pump control method of claim 3 wherein the cycle of periodic on times for the first and second pumps are between about 15 and 185 milliseconds.

6. The pump control method of claim 1 wherein the periodic on time for the first pump is between about 7.5% and 50% of the combination of the periodic off time and the periodic on time.

7. The pump control method of claim 1 wherein the periodic on time for the second pump is between about 7.5% and 50% of the combination of the periodic off time and the periodic on time.

8. The pump control method of claim 6 wherein the periodic on time for the second pump is between about 7.5% and 50% of the combination of the periodic off time and the periodic on time.

9. The pump control method of claim 3 wherein the periodic on time for the first and second pumps is between about 7.5% and 50% of the combination of the periodic off time and the periodic on time.

10. The pump control method of claim 1 wherein the voltage potential for the first and second pumps is between the first voltage and the second voltage is 28 VDC.

* * * * *